(12) United States Patent  
Holmes (10) Patent No.: US 6,313,936 B1
(45) Date of Patent: Nov. 6, 2001

(54) METHOD AND DEVICE FOR SWITCHING WAVELENGTH DIVISION MULTIPLEXED OPTICAL SIGNALS USING MICRO-ELECTROMECHANICAL MIRRORS

(75) Inventor: Richard B. Holmes, Cameron Park, CA (US)

(73) Assignee: General Nutronics, Inc., Cameron Park, CA (US)

( * ) Notice: Subject to any disclaimer, the term of this patent is extended or adjusted under 35 U.S.C. 154(b) by 0 days.

(21) Appl. No.: 09/716,196

(22) Filed: Nov. 17, 2000

Related U.S. Application Data (63) Continuation-in-part of application No. 09/666,898, filed on Sep. 20, 2000.

(51) Int. Cl.[7] .............................. G02F 1/03; G02F 27/10; G02F 1/07; G02B 27/10
(52) U.S. Cl. .......................... 359/250; 359/246; 359/619; 359/627
(58) Field of Search .................................. 359/245, 246, 359/250, 619, 627

(56) References Cited

U.S. PATENT DOCUMENTS 5,990,473 * 11/1999 Dickey et al. .................. 250/231.13

FOREIGN PATENT DOCUMENTS 11-311746-A * 11/1999 (JP) .............................. G02B/26/08

* cited by examiner

*Primary Examiner*—Ricky Mack
(74) *Attorney, Agent, or Firm*—Ian F. Burns (57) ABSTRACT

A switch device and method is disclosed that is capable of switching wavelength division multiplexed optical signals. The device comprises a switch element that may include a beam splitter, a plurality of wave plates, and a plurality of micro-electromechanical mirrors. The beam splitter is adapted to transmit light in one polarization and reflect light another polarization. The wave plates are adapted to change the polarization of the light so that the beam splitter either reflects or transmits the light. The micro-electromechanical mirrors are adapted to position the beam of light so that it is directed to a selected target.

3 Claims, 12 Drawing Sheets

METHOD AND DEVICE FOR SWITCHING WAVELENGTH DIVISION MULTIPLEXED OPTICAL SIGNALS USING MICRO-ELECTROMECHANICAL MIRRORS

CROSS REFERENCE TO RELATED APPLICATIONS

This application is a continuation-in-part application of U.S. patent application Ser. No. 09/666,898, filed on Sep. 20, 2000.

BACKGROUND OF THE INVENTION

1. Field of Invention

The present invention relates to a device and method for switching wavelength division multiplexed light signals using micro-electromechanical mirrors.

2. Description of Related Art

Optical communication systems are a substantial and rapidly growing part of communication networks. The expression "optical communication system," as used herein, relates to any system that uses optical signals to convey information across an optical transmission device, such as an optical fiber. Such optical systems may include, but are not limited to telecommunication systems, cable television systems, and local area networks (LANs).

While the need to carry greater amounts of data on optical communication systems has increased, the capacity of existing transmission devices is limited. Although capacity may be expanded, e.g., by laying more fiber optic cables, the cost of such expansion is prohibitive. Consequently, there exists a need for a cost-effective way to increase the capacity of existing optical transmission devices.

Wavelength division multiplexing (WDM) has been adopted as a means to increase the capacity of existing optical communication systems. In a WDM system, plural optical signals are carried over a single transmission device, each channel being assigned a particular wavelength.

An essential part of optical communication systems is the ability to switch or route signals from one transmission device to another. Designers have considered using bubbles that are capable of changing their internal reflection for switching optical signals. However, this technique is unable to switch multiple wavelengths individually. Furthermore, both of these devices have limited switching speeds, in the range of 10 kHz for the mirror devices and in the range of 100 Hz for the bubble devices.

Micro-electromechanical mirrors are capable of switching optical signals. However, these mirrors have not been utilized in a way that would allow them to be used in a WDM system.

Other switching approaches, such as the approach disclosed in U.S. Pat. Ser. No. 4,769,820, issued to Holmes, can switch data at GHz rates, which is effectively switching at GHz transition rates. However, this approach requires substantial optical switching power, has potential cross talk, and cannot resolve wavelength over-utilization issues. What is needed is a means for switching wavelength division multiplexed signals that is capable of doing so at high speeds with no cross talk and requires low switching power.

SUMMARY OF INVENTION

1. Advantages of the Invention

One advantage of the present invention is that it is able to switch signals of different wavelengths.

Another advantage of the present invention is that it is able to switch at high speeds.

A further advantage of the present invention is that it does not require high power.

Another advantage of the present invention is that it does not suffer from crosstalk.

Another advantage of the present invention is that it is able to switch between wavelengths and fibers to avoid transmission device or wavelength over-utilization.

Another advantage of the present invention is that it is able to broadcast to multiple transmission devices or couplers simultaneously.

A further advantage of the present invention is that it is able to regenerate and restore signals.

An additional advantage of the present invention is that it can transmit through air or other intervening media to a receiver without a costly or slow electrical interface.

These and other advantages of the present invention may be realized by reference to the remaining portions of the specification, claims, and abstract.

2. Brief Description of the Invention

The present invention comprises an optical switch element for use with at least one source and a plurality of targets. The source is adapted to transmit an optical signal to the optical switch element and the targets are adapted to receive the optical signal from the optical switch element.

The optical switch element comprises a beam splitter, first and second wave plates, and first and second micro-mechanical mirrors. The beam splitter is adapted to transmit light in a first predetermined polarization and reflect light in a second predetermined polarization. The first wave plate is positioned between the source and the beam splitter and it is adapted to transmit light in the polarization that is reflected by the beam splitter, wherein light transmitted by the source passes through the wave plate and is reflected by the beam splitter.

The first micro-electromechanical mirror is positioned to receive light reflected by the beam splitter and it is adapted to selectively reflect light in a plurality of paths, the paths corresponding to the positions of the plurality of targets. The second micro-electromechanical mirror is positioned to receive light reflected by the first micro-electromechanical mirror and it is adapted to reflect light in a path, the path being a predetermined orientation relative to at least one of the targets.

The second wave plate is positioned between the second micro-electromechanical mirror and the beam splitter and it is adapted to transmit light in the polarization that is transmitted by the beam splitter, wherein light reflected by the second micro-electromechanical mirror passes through the second wave plate and the beam splitter and is transmitted to a target.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

Single Detector Switch Element

Figure 1:
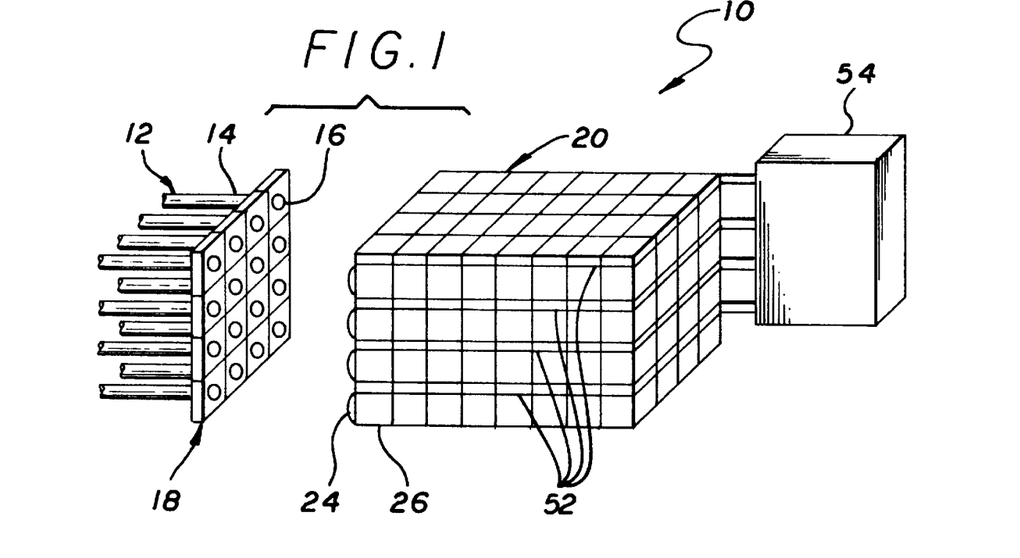
FIG. 1 is substantially a perspective schematic diagram of one switch device of the present invention.

As seen in FIG. 1, the present invention comprises a switch device generally indicated by reference number 10. Switch device 10 may be used in almost any optical communication system. Switch device 10 comprises sources and targets 12 and a switch array 20. Sources and targets 12 comprise a source of incoming light signals and targets on to which switch array 20 transmits outgoing signals. The sources and targets may be the same or different devices or objects. In the example shown in FIG. 1, sources and targets 12 are optical fibers 14, however, many other devices and transmission mediums may be used. Sources and targets 12 may include any number of fibers 14 and may use many different types of fibers. Each optical fiber 14 comprises an end 16. Ends 16 are preferably arranged in a two dimensional array, wherein the ends are substantially planar. It is recognized that array 18 may have many different configurations, such as the square array shown in FIG. 1 or rectangular arrays.

Figure 2:
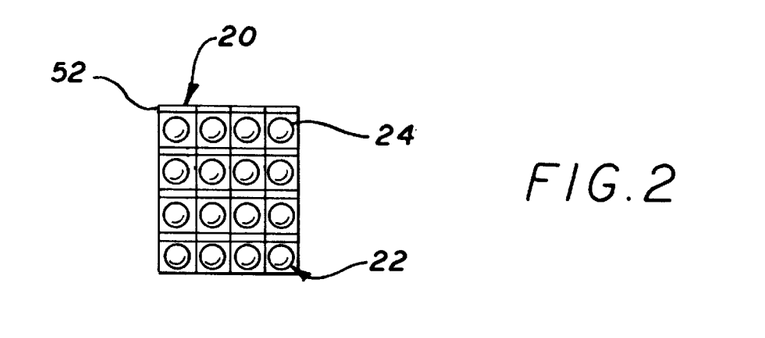
FIG. 2 is substantially a front schematic diagram of one embodiment of the switch array of the present invention.
Figure 3:
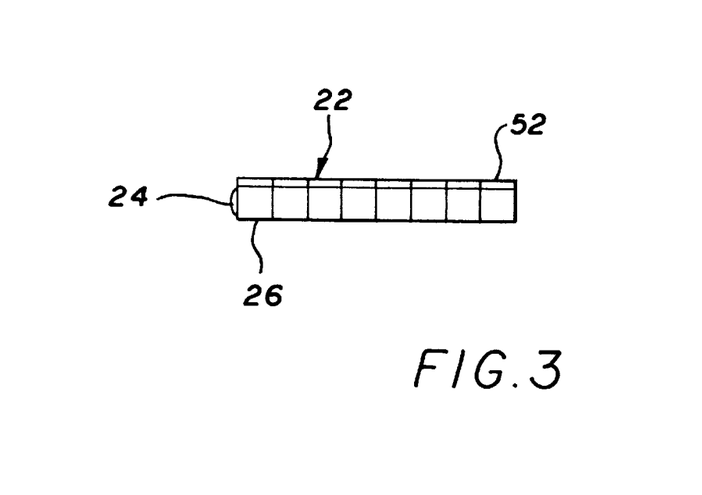
FIG. 3 is substantially a side schematic diagram of the linear array of switch elements of the present invention.

Turning to FIG. 2 and 3, switch array 20 comprises a plurality of linear arrays 22. In this embodiment, there is a linear array 22 for each optical fiber 14 in the sources and targets 12. This allows switch array 20 to receive signals from each optical fiber 14 in sources and targets 12. As will be discussed below, however, switch array 20 may comprise a different number of linear arrays 22.

As seen in FIGS. 1, 2, and 3, each linear array 22 is provided with a lens 24. As will be discussed below, lenses 24 focuses light passing between array 18 and linear arrays 22. The focal length of lens 24 should equal the distance from the end 16 to the front of the switch array 20.

Referring to FIG. 3, each linear array 22 comprises at least one switch element 26. Any number of switch elements may be provided.

Figure 4:
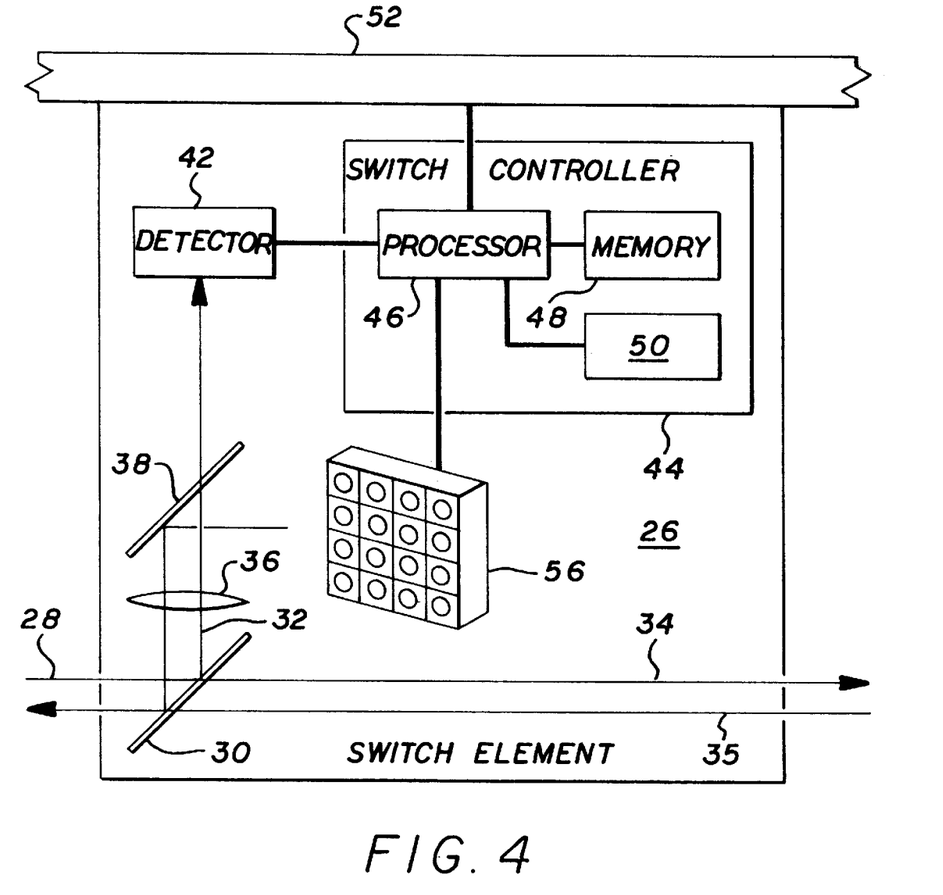
FIG. 4 is substantially a schematic diagram of the switch element of the present invention.

Turning to FIG. 4, each switch element 26 is arranged to receive incoming light 28 from an optical fiber 14 (not shown in FIG. 4). As incoming light 28 enters switch element 26, it intersects beam splitter 30. Beam splitter 30 is a dichroic beam splitter that is adapted to reflect a predetermined wavelength or range of wavelengths of light 32. The beam splitter may be a beam splitter, such as model number 03 BSC 23 or 03 BDL 005 available from Melles Griot, having an office in Irvine Calif.

If incoming light 28 contains the predetermined wavelength that may be reflected by beam splitter 30, the beam splitter reflects that portion 32 of the light. Light that is not the predetermined wavelength will pass through beam splitter 30. This non-reflected light 34 may be transmitted to a second switch element (not shown in FIG. 4) where it would it is subjected to another beam splitter (not shown). However, the beam splitter in the second switch element would be adapted to reflect light in another range of wavelengths and transmit light not in that range to another switch element. In this way, linear array 22 separates wavelength division multiplexed light signals into its individual signals.

As will be discussed below, each switch element may be capable of producing light signals. Light that is produced by other switch elements, outgoing light 35, is transmitted back along the path of incoming light 28. Since the outgoing light does not contain light in the range of wavelengths that is reflected by beam splitter 30, this light passes through the beam splitter and is transmitted out to the front of the linear array.

Reflected light 32 is directed through an optional focusing lens 36. In one embodiment, light 32 then falls on beam splitter 38. Beam splitter 38 allows light 32 to pass to detector 42. Detector 42 is adapted to detect signals in reflected light 32. Detector 42 may generate electrical signals based on the light signals. Detector 42 may be many different well known devices, such as 2609C Broadband Photodiode Module for both 1310 and 1550 nm detection available from Lucent Technologies or InGaAs p-i-n photodiodes for 1000–1700 nm detection, Part C30641E, available from EG&G. The electrical signals are transmitted to switch controller 44.

Switch controller 44 comprises a microprocessor 46 and memory 48. Microprocessor 46 is adapted to determine the intended destination of the light signal and route the signal to an appropriate fiber. Microprocessor 46 may be any of a number of devices that are well known in the art. For example, microprocessor 46 may be an Intel Pentium III or other similar processor. Memory 48 is preferably random access memory that also may be any of a number of devices that are well known in the art. Switch controller 44 may also comprise non-volatile memory 50 that may contain programming instructions for microprocessor 46.

Figure 5:
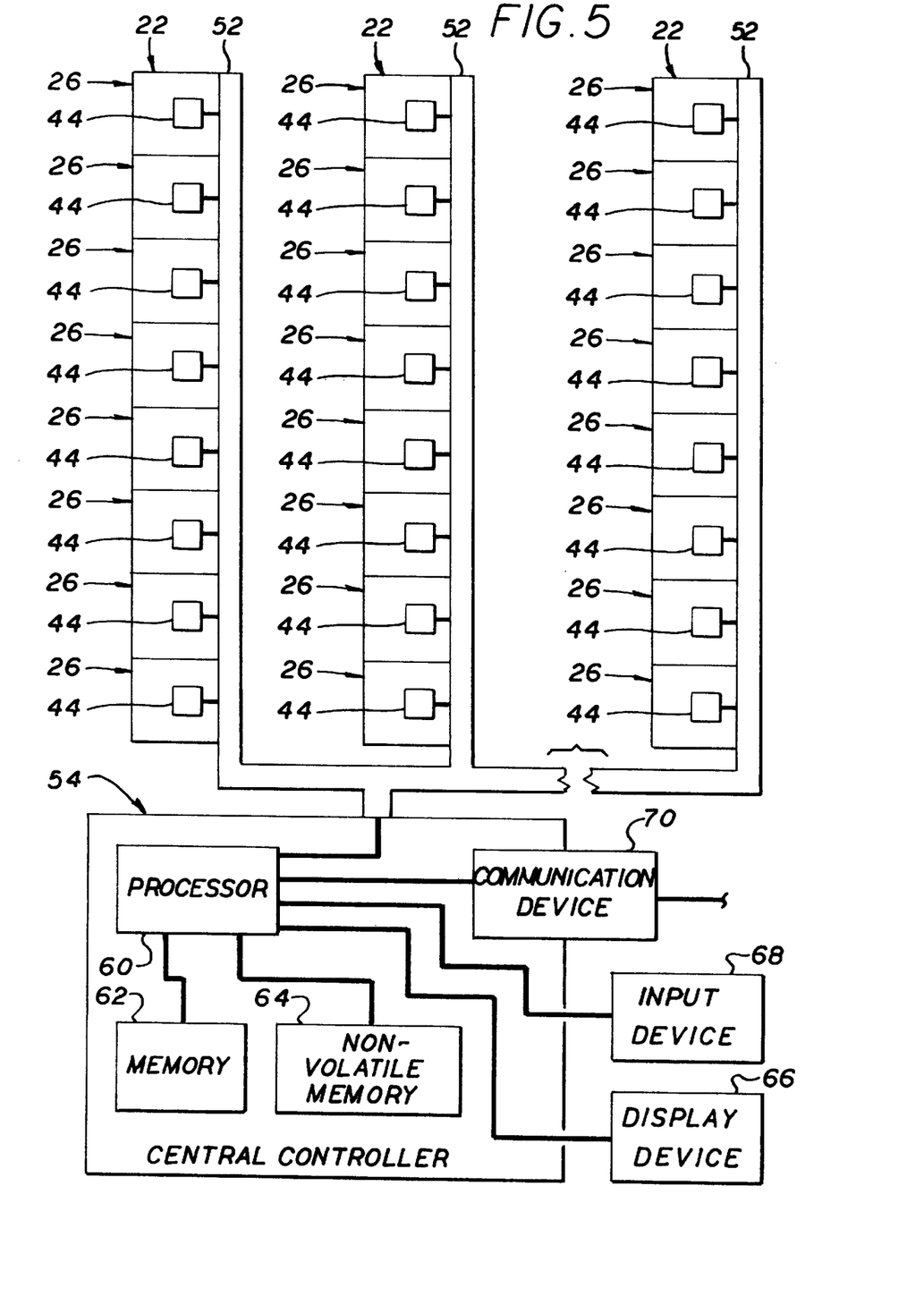
FIG. 5 is substantially a schematic diagram of the switch array and central processor of the present invention.

Each light signal preferably carries a header that contains information that either identifies the signal or indicates its intended destination. Switch controller 44 is adapted to read the header. Switch controller 44 may be adapted, either alone or in coordination with other devices, to determine the destination of the light signal. However, in this embodiment, in order to prevent simultaneous transmissions in the same wavelength on the same optical fiber, which would result in interference when the signals are received, it is necessary for each switch controller 44 to coordinate with other switch controllers. In this embodiment, this may be facilitated by bus 52. Bus 52 is connected to each switch element 26 and it allows each switch element to communicate with a central controller 54 (not shown in FIG. 4). As seen in FIG. 5, central controller 54 is in communication with each bus 52 of each linear array 22. This allows central controller 54 to receive signals from each switch element 26.

Central controller 54 may comprise a processor 60 that is adapted to perform computer operations. Processor 60 is in communication with memory device 62, which may be random access memory (RAM), and non-volatile memory 64, which is adapted to store data when power to controller 54 is interrupted. Non-volatile memory 64 may be many different kinds of memory devices, such as a hard disk drive, flash memory, or erasable programmable read only memory (EPROM). Central controller 54 may be in communication with a display device 66, such as a monitor or printer, and input device 68, such as a keyboard. Display device 66 and input device 68 are adapted to allow an operator or user to communicate with switch device 10 (see FIG. 1).

Central controller 54 may also comprise a communication device 70, which may be external or internal. Communication device 70 is adapted to allow central controller 54 to communicate with other devices, such as other central processors or a computer that controls the optical system. Communication device 70 may be many different types of devices that are well known in the art, such as a modem, a network card, or a wireless communication device.

Figure 6:
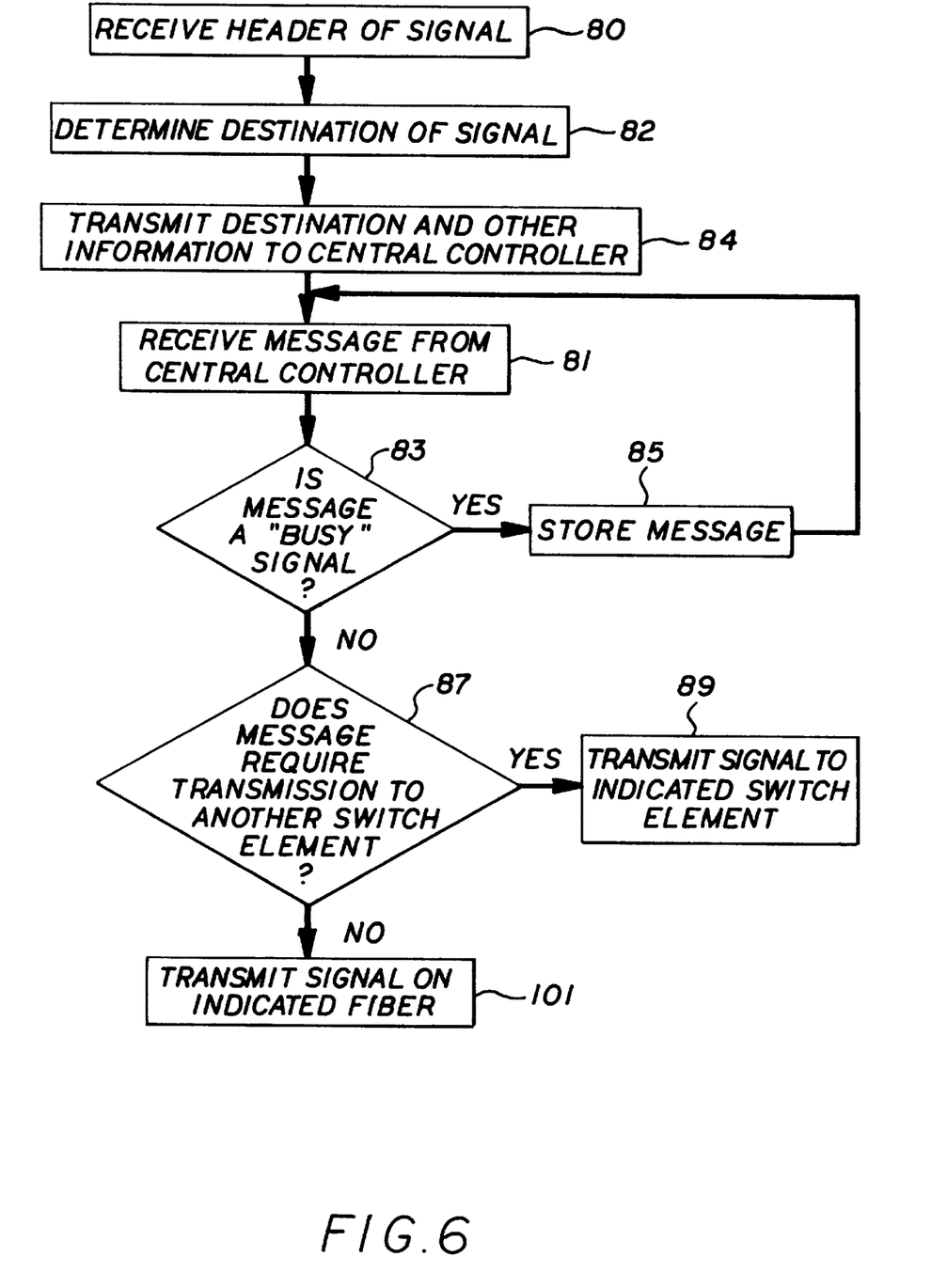
FIG. 6 is substantially a flow chart of operation of the switch controller of the present invention, with regard to the transmission of signals.

Referring now to FIG. 6, when switch element 26 receives a signal, the header of the signal is transmitted to switch controller 44, as seen in step 80. Switch controller 44 then determines the destination of the signal 82 and transmits the destination and other information to central controller 54. Other information may include the size of the signal, the wavelength of the signal, wavelengths in which the switch element capable of transmitting, etc.

Figure 7A:
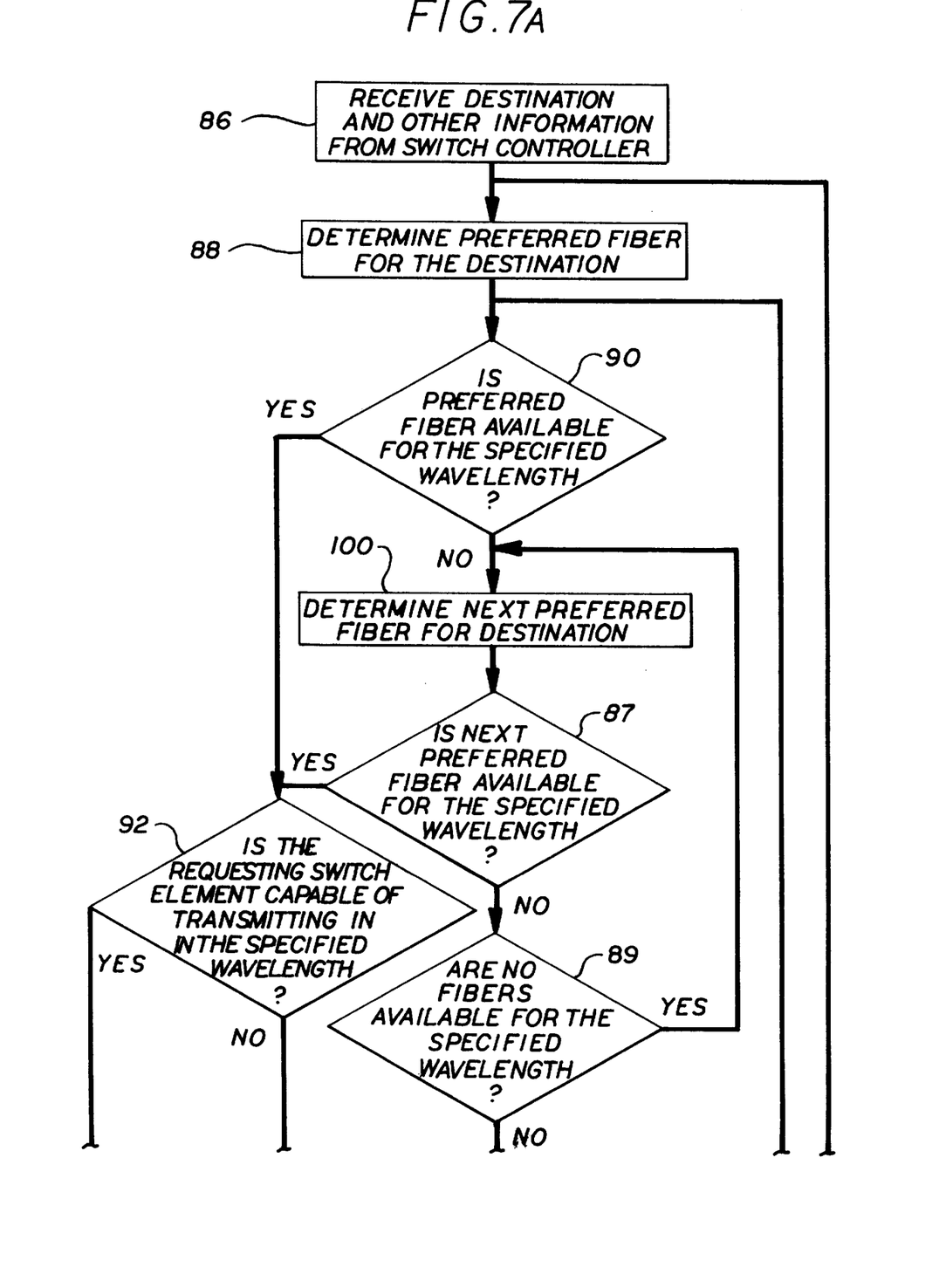
FIG. 7 is substantially a flow chart of operation of the central controller of the present invention, with regard to the transmission of signals.
Figure 7B:
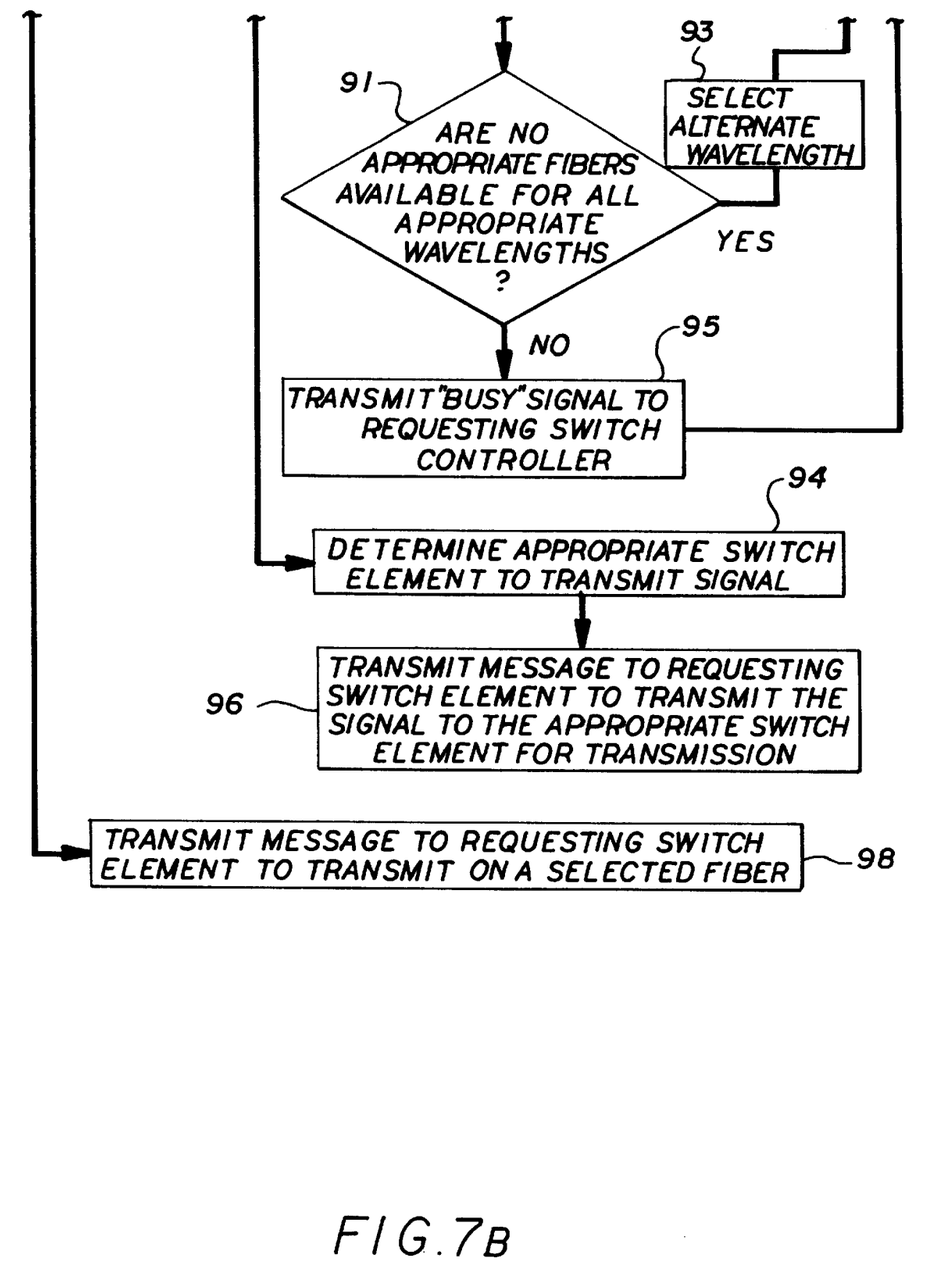

Turning now to FIG. 7, central controller 54 receives the destination and other information from the requesting switch element 86. Central controller 54 then determines the preferred fiber for the particular destination 88. This may be performed by referring to a transmission registry that contains destinations and a number of different fibers that are capable of transmitting the signal to the destination.

The registry may be represented by the following table (Table 1):

TABLE 1

| 1. DESTINATION REGISTRY | | | |
|---|---|---|---|
| Destination | Preferred Fiber | Next Preferred Fiber | . . . |
| 1 | A | E | . |
| 2 | F | B | . |

TABLE 1-continued

| 1. DESTINATION REGISTRY | | | |
|---|---|---|---|
| Destination | Preferred Fiber | Next Preferred Fiber | . . . |
| 3 | C | D | . |
| . | . | . | . |
| . | . | . | . |

After central controller 54 determines the preferred fiber, it then determines if the preferred fiber is unavailable for the specified wavelength 90. This check may be accomplished in different ways. In one method, central controller 54 keeps a registry of signals being transmitted in each wavelength on each optical fiber 14. This registry may be represented by the table shown below (Table 2):

TABLE 2

| 2. TRANSMISSION REGISTRY | | | |
|---|---|---|---|
| Fiber | Wavelength 1 | Wavelength 2 | . |
| A | 0 | 1 | . |
| B | 1 | 1 | . |
| C | 0 | 0 | . |
| . | . | . | . |
| . | . | . | . |

In this table "0" may represent that the designated fiber is not occupied by the designated wavelength and "1" may represent that the fiber is occupied by the designated wavelength. This registry may also be used to store other information about the fibers. When a switch element has completed sending a signal, it may send a signal to central controller 54 that it has completed transmission. Central controller 54 would then clear the registry of the transmission. Alternatively, the registry may be cleared after an appropriate amount of time has passed. The amount of time may be obtained from the original request. In another method, central controller 54 polls each switch element 26 to determine whether it is currently sending a signal.

If the preferred fiber is available for the specified wavelength, central controller 54 then authorizes transmission by the requesting switching element 26, step 98. In an alternative embodiment, Switch element 26 may be designed to transmit in a plurality of wavelengths. Emitter array 56 may be capable of transmitting in a plurality of wavelengths or additional emitter arrays, adapted to transmit in a different wavelength that the first emitter array, and beam splitters may be provided. The inquiry in step 92 may be performed by referring to a switch element registry (not shown). The switch element registry may contain a listing of all switch elements and the wavelengths in which they are adapted to transmit. If the requesting switch element is capable of transmitting in the specified wavelength, central controller 54 then transmits a message to the requesting switch element to transmit on the selected fiber 98. If the requesting switch element is not capable of transmitting in the specified wavelength, central controller 54 determines an appropriate switch element to transmit the signal 94. Central controller 54 then transmits a message to the requesting switch element to transmit the signal to the appropriate switch element 96 for transmission.

Returning to step 90, if the preferred fiber is not available for the specified wavelength, central controller 54 would then determine the next preferred fiber for the destination 100. Central controller 54 would then determine if the next preferred fiber is available for the specified wavelength 87. If the next preferred fiber is available for the specified wavelength, central controller 54 would go to step 92 and repeat until a fiber is found or no fiber is available at the specified wavelength 89. If no fiber is available for the specified wavelength, central controller 54 would return to step 100. If all fibers are unavailable for the specified wavelength, central controller 54 would determine that all appropriate fibers are unavailable for all appropriate wavelengths 91. If all appropriate fibers are not unavailable for all appropriate wavelengths, central controller 54 would select an alternate wavelength 93 and return to step 90. If all appropriate fibers are unavailable for all appropriate wavelengths, central controller 54 would transmit a "busy" signal to the requesting switch controller 95. Central controller 54 would then return to step 88.

Returning to FIG. 6, switch controller 44 waits for a message from central controller 54. When switch element 44 receives a message from the central controller 81, it determines whether the message is a "busy" signal 83. If the message is a busy signal, switch controller 44 may store the message 85 and wait for another message from central controller 54. If the message is not a busy signal, switch controller 44 determines whether the message requires transmission to another switch element 87. If the message requires transmission to another switch element, switch controller 44 transmits the signal to the indicated switch element 89. This may be performed by transmitting the signal over bus 52. If the message does not require transmission to another switch element, switch controller 44 transmits the signal on the indicated fiber 101.

Returning now to FIG. 4, when switch controller 44 sends a signal, it drives emitter array 56 to generate the signal. Emitter array 56 comprises a plurality of different areas or emitters arranged in a two-dimensional array, each area being adapted to independently transmit a light signal. Each individual emitter may be many different kinds of emitters that are suitable for the particular optical fiber system. For example, an individual emitter in the 1310 nm range may be a Daytona laser, model 1861A, available from Lucent Technologies. Emitter array 56 is adapted to produce light in the predetermined range of wavelengths that beam splitter 30 is intended to reflect. Array 56 is also adapted to generate signals in specific areas of the array so that the signal can be mapped on to the appropriate optical fiber or target. As the signal is generated, it is reflected by beam splitter 38 and passes through lens 36. The signal is then reflected by beam splitter 30 back along the path of the incoming light 28. When the signal reaches the front of the array, it is imaged by lens 24 on to array 18. The signal produced by a portion of emitter array 56 is then received by the corresponding optical fiber end 18 or other target. The focal length of lens 36 should be approximately equal to the optical path length from the center of emitter array 56 to the location of the imaging lens. In this way, each switch element can transmit a signal to any or all optical fibers 14 in sources and targets 12.

Detector Array Switch Element

Figure 8:
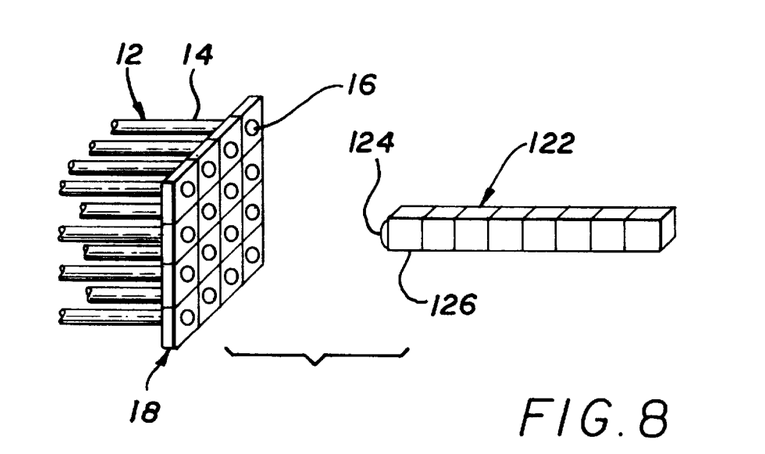
FIG. 8 is substantially a schematic diagram of the preferred embodiment of the switch device of the present invention.

Turning now to FIG. 8, the preferred embodiment of the present invention is similar to the previously discussed embodiment. However, switch array 20 is replaced with a single linear array 120. Linear array 120 comprises a lens 124 and a plurality of switch elements 126. Lens 124 performs a similar function to lens 24 (see FIGS. 1 and 3), however, switch elements 126 differ from switch elements 26 in that each switch element comprises a detector array 142 that is capable of detecting signals from each of the optical fibers 14.

Figure 9:
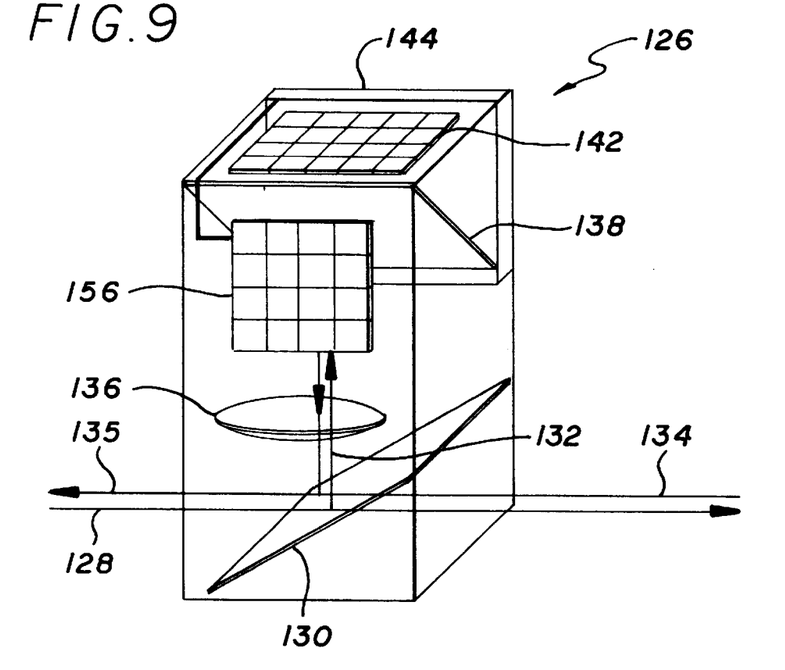
FIG. 9 is substantially a schematic diagram of the switch element of the preferred embodiment of the present invention.

Turning to FIG. 9, each switch element 126 is arranged to receive incoming light 128 from an optical fiber 14 (not shown in FIG. 9). As incoming light 128 enters switch element 126, it intersects beam splitter 130. Similar to beam splitter 30, beam splitter 130 is a dichroic beam splitter that is adapted to reflect a predetermined wavelength or range of wavelengths of light 32.

If incoming light 128 contains the predetermined wavelength that may be reflected by beam splitter 130, the beam splitter reflects that portion 132 of the light. Light that is not the predetermined wavelength will pass through beam splitter 130. This non-reflected light 134 may be transmitted to a second switch element (not shown in FIG. 4) where it would it is subjected to another beam splitter (not shown). Similar to the first embodiment, the beam splitter in the second switch element would be adapted to reflect light in another range of wavelengths and transmit light not in that range to another switch element.

Light that is produced by other switch elements, outgoing light 135, is transmitted back along the path of incoming light 128.

Reflected light 132 is directed through an optional focusing lens 136. In this embodiment, light 32 then falls on beam splitter 138. Beam splitter 138 allows light 132 to pass to detector array 142. Detector array 142 is adapted to detect signals in reflected light 132 and, as mentioned above, detector array 142 is capable of distinguishing different signals that are being transmitted by different fibers 14 or sources. Detector 142 may generate electrical signals based on the light signals. The electrical signals are transmitted to switch controller 144.

Switch controller 144 may be similar to switch controller 44 with a microprocessor and memory (not shown). Microprocessor 46 is adapted to determine the intended destination of light signals and route the signals to an appropriate fiber.

In this embodiment, since each switch element 126 is capable of receiving light signals from each fiber 14 in a predetermined range of wavelengths, conflicts, or interferences between signals can be handled within the switch element. Switch controller 144 may have its own destination registry (see Table 1) and transmission registry (see Table 2) and it can be programmed to manage signals using the methods described above.

Controller 144 drives emitter array 156 to transmit an outgoing signal. This signal passes through lens 136 and is reflected by beam splitter 130 back along the path of incoming light 128 to a target (not shown).

This embodiment has several advantages of the previous embodiment. This embodiment only requires one linear array 122 and it may not be necessary to provide a bus and a central controller. Thus, the complexity and cost of the device may be less. Furthermore, since transmission need not be coordinated through a central controller, signals can be retransmitted more quickly and conflicts can be resolved more quickly.

However, it is recognized that it may be desirable to provide some form of communication device, such as bus 52, and an outside controller, such as central controller 54, to update switch controller 144. For example, if a fiber has been disconnected from the network, switch controller 144 would need to be informed that this fiber is no longer available for transmission. In addition, device 10 may also be a node from which data is downloaded. In this application, it would be necessary for each switch element 126 to transmit data to another device to make use of the information.

It is also recognized that a plurality of detector and emitter arrays may be used in one switch element to detect and emit a plurality of wavelengths. This would allow one switch element to perform the same function of a linear array of switch elements. Thus, the switch device of the present invention may comprise only a single switch element. The same result could be obtained by using single detector and emitter arrays that are adapted to detect and emit a plurality of wavelengths.

Figure 10:
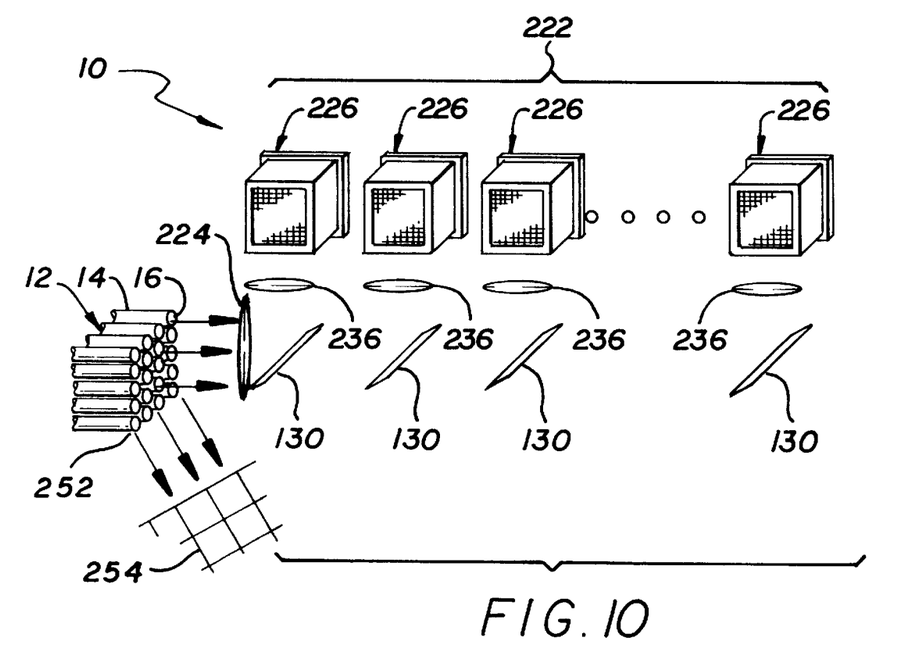
FIG. 10 is substantially a schematic diagram of another embodiment of the switch device of the present invention.

The embodiment disclosed in FIG. 10 utilizes a linear array 222 that is similar to linear array 122. However, each switch element 226 comprises a multi-focal lens that is adapted to focus light differently depending upon the target of the light. This embodiment also includes mirrors 252 that can be used to direct the light to a target 254 without an optical waveguide. This embodiment is useful for applications where light is transmitted to targets over a short distance. For example, instead of installing optical fibers throughout an existing building, this embodiment of the present invention can be used to transmit signals to specific locations on the exterior of the building where a detector can receive the signal. An emitter associated with the detector can transmit signals to the device 10.

Single Source Emitter Switch Element

Figure 11:
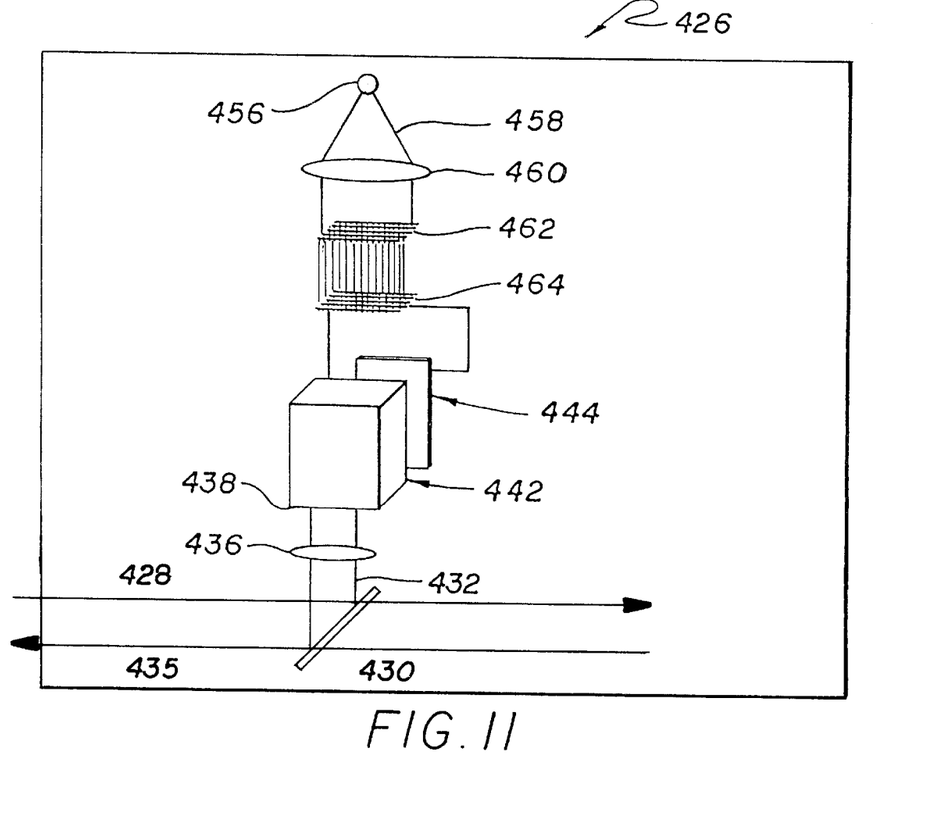
FIG. 11 is substantially a schematic diagram of another embodiment of the switch device of the present invention that utilizes a single source emitter.
Figure 12:
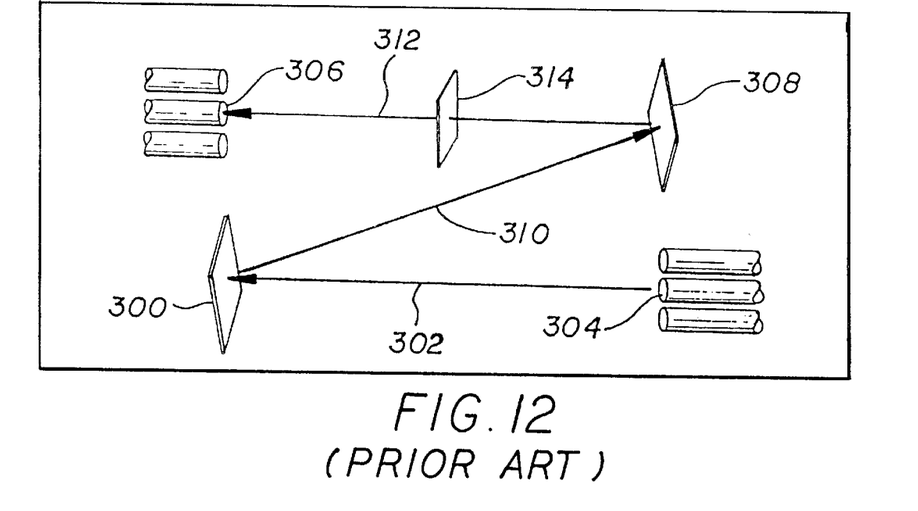
FIG. 12 is a schematic diagram of a prior art switch device that utilizes two micro-electromechanical mirrors.

As seen in FIG. 11, the present invention comprises an alternative embodiment generally indicated by reference number 426. Each switch element 426 is arranged to receive incoming light 428 from a source (not shown in FIG. 11). As incoming light 428 enters switch element 426, it intersects beam splitter 430. Similar to beam splitter 30, beam splitter 430 is a dichroic beam splitter that is adapted to reflect a predetermined wavelength or range of wavelengths of light.

If incoming light 428 contains the predetermined wavelength that may be reflected by beam splitter 430, the beam splitter reflects that portion 432 of the light. Light that is not the predetermined wavelength will pass through beam splitter 130. This non-reflected light 134 may be transmitted to a second switch element (not shown in FIG. 9) where it would it is subjected to another beam splitter (not shown). Similar to the first embodiment, the beam splitter in the second switch element would be adapted to reflect light in another range of wavelengths and transmit light not in that range to another switch element.

Light that is produced by other switch elements, outgoing light 435, is transmitted back along the path of incoming light 428.

Reflected light 432 is directed through an optional focusing lens 436. In this embodiment, light 432 then falls on beam splitter 438. Beam splitter 438 allows light 432 to pass to detector array 442. Detector array 442 is adapted to detect signals in reflected light 432 and, as mentioned above, detector array 442 is capable of distinguishing different signals that are being transmitted by different sources. Detector 442 may generate electrical signals based on the light signals. The electrical signals are transmitted to switch controller 444.

Switch controller 444 may be similar to switch controller 44 with a microprocessor and memory (not shown). The microprocessor is adapted to determine the intended destination of light signals and route the signals to an appropriate fiber. As in the previous embodiment, conflicts or interferences between signals can be handled within switch element 426.

Switch element also comprises an emitter 456 that is adapted to constantly transmit light 458 over a period of time. The light is produced in a desired range of wavelengths. Light 458 is transmitted to lens 460, which is adapted to collimate the light. Light 458 may then pass through optional lenslet array 462, which is adapted to concentrate the light on individual modulators in modulator array 464. The individual modulators in modulator array 464 may be modulators that are well known in the art, such as lithium niobate modulators available from Ortel in Azusa, Calif. Modulator array 464 is in communication with controller 444, which may drive individual modulators to allow light to pass through the array. The position of the individual modulators corresponds to the position of targets for the light 458.

By driving an individual modulator to allow light to pass through the modulator at selected times, the modulator can produce an optical signal. The signal passes through beam splitter 438 and lens 436 and is reflected by beam splitter 430 to a predetermined target.

Micro-electromechanical Mirrors Switch Element

The present invention also comprises an embodiment that utilizes micro-electromechanical mirrors (MEMs). MEMs are well known in the art, an example of which has been produced by Lucent Technologies in Murray Hill, New Jersey. MEMs are mirrors that may be selectively positioned in a plurality of positions. This allows the MEMs to reflect light transmitted from a source to a plurality of locations or targets. A plurality of MEMs may be placed in an array to switch light from a plurality of sources.

As seen in FIG. 11, MEMs can be used to switch light spatially using what is called a "3D" or "beamsteering" approach. In this approach, a first MEMs array 300 is positioned to receive a plurality of incoming parallel light beams 300, sometimes called "pencil beams," from a source or sources 304. Before light falls on a particular MEM, the MEM is positioned or aimed to reflect light along a selected path. The path of the light corresponds to a location of a particular target 306 among a plurality of targets.

For some targets, such as an optical fiber, it is desirable that light being transmitted to the target be substantially parallel to the normal axis of the target. If first MEM array 300 were to reflect light directly to a target, it may cause the light to be non-parallel to the normal axis of the target. This is so because each MEM on array 300 may not be aligned with the intended target and it is necessary to reflect light at an angle relative to the path of the incoming light. To address this problem, a second MEM array 308 is provided. First MEM array reflects light 310 to a MEM on second MEM array 308. The particular MEM on second MEM array 308 is aligned with the axis of the desired target 306 and the MEM is positioned so that light reflected by it is parallel to the preferred axis of the target.

A lenslet array 314, which may comprise an array of lenses, may be provided between second MEM array 308 and target 306 to focus the light on the target. A controller may also be provided (not shown) for controlling the position of the individual MEMs in the MEM arrays.

The present invention comprises embodiments that utilize MEMs to switch optical signals. These embodiments utilize polarization of light signals to selectively reflect and transmit light. Polarization is a well-known property of light. There are two polarization states, typically denoted x and y, in which the electric field of the light oscillates in the x or y direction, respectively, as it propagates in the z direction. Such light is called linearly polarized x or y light, respectively.

Light of different polarizations can be superposed, i.e., added, so that states of polarization ax+by are possible. Furthermore, a and b can be complex; a complex part denotes a phase lag or lead between the two possible states.

In particular, a polarization state x+iy, i=(−1)^(1/2), corresponds to a polarization state that rotates in the positive angle sense as it propagates and therefore is called right-circularly polarized. The state x−iy corresponds to rotations of the electric field that rotates in the negative angle sense, and is called left-circularly polarized. Light can be switched from one polarization state to another using λ/2 and λ/4 wave plates, which are well known to those skilled in the art. A λ/4 plate applies an additional factor of i (one-quarter of a full wave) to the y state, converting x+y to x+iy, or converting x+iy to x−y. Similarly, a λ/2 plate applies a factor of −1 (one half of a full wave) to the y component, converting x+y to x−y. These facts are used in the embodiments described below.

Additionally, it is well known to those skilled in the art that polarizing beam splitters can reflect one linear polarization, for example, x, and transmit the second linear polarization state, y. These devices may be used to reflect or transmit light depending on the polarization of the light.

Figure 13:
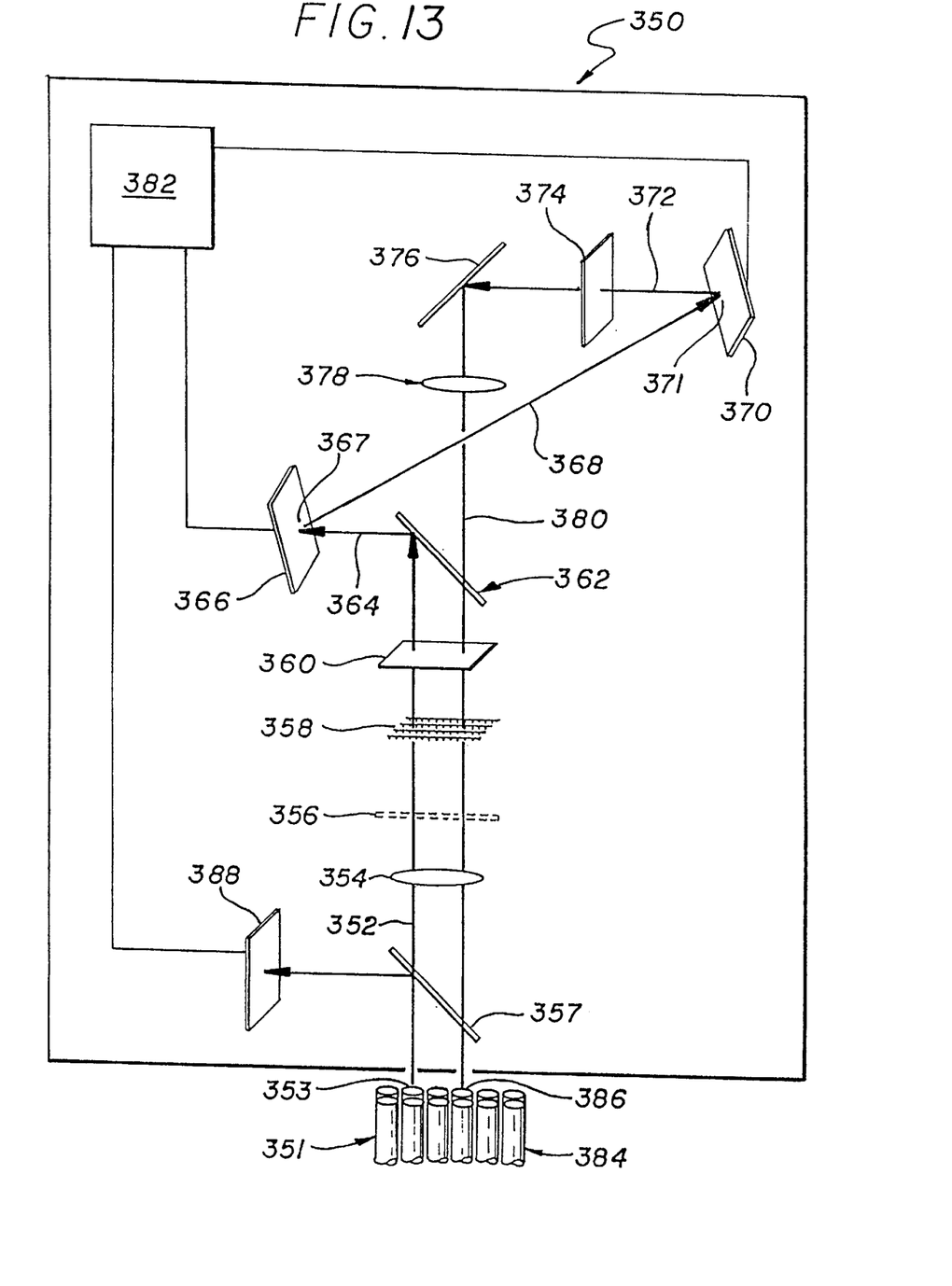
FIG. 13 is substantially a schematic diagram of another embodiment of the switch device of the present invention that utilizes two micro-electromechanical mirrors and two wave plates.

Turning now to FIG. 13, the present invention also comprises an alternative switch element generally indicated by reference number 350. Circularly polarized light 352 is transmitted by source 353. In the example calculations that follow, incoming light 352 is assumed to be right polarized light. Light 352 passes through lens 354, which focuses the light onto image plane 356. The light is allowed to diverge from the image plane until the light from the individual sources is of a size that matches the size of the individual micro-mirrors on MEMs array 366. Light 352 then passes through a lenslet array 358 that is adapted to collimate the light, i.e., make it into a "pencil beam" that neither diverges nor converges.

A beam splitter 357 may be provided in the path of incoming light 352 to reflect a portion of the incoming light to a detector array 388. Detector array 388 is adapted to convert the light signal to electrical signals and transmit the signals to controller 382. Controller 382, similar to controllers in the embodiments discussed above, is adapted to determine the destination of the incoming signal and drive MEM arrays 366 and 370 to the route the signal to the appropriate target 386. As described above, each optical signal may be provided with a header that allows controller 382 to determine the destination of the signal. A gap may be provided between the header and the rest of the signal to provide sufficient time for controller 382 to determine the destination and drive particular MEMs in MEM arrays 366 and 370 to their desired angular positions.

After passing through lenslet array 358, light 352 passes through a λ/4 plate 360. This converts the right-circularly polarized light from a state x+iy to x−y. However, the state x−y is a purely linearly polarized state of light in a 45 degree direction, and will be denoted by x'. A properly oriented polarizing beam splitter 362 will then reflect the x'-polarized light to MEM array 366.

Reflected light 364 is transmitted to a particular MEM 367 that is aligned with the particular source 353 that emitted incoming light 352. MEM 367 is angularly positioned by controller 382 to reflect the light to a particular MEM 371 on MEM array 370. MEM 371 is aligned with a particular target 386 in a plurality of targets 384. It is recognized that targets 384 may be the same devices as sources 351. MEM 371 is angularly positioned by controller 382 to reflect incoming light 368 to target 386. The angular position of MEM 371 depends on the position of MEM 367 on MEM array 366. MEM arrays 366 and 370 are oriented so that the light passes through free space in this embodiment.

Reflected light 372 then passes through a λ/2 plate, which converts the polarization of the incident light from x'=x−y to y'=x+y, which is an orthogonal to x'. The light is then reflected by mirror 376. Reflected light 380 passes through lens 378, which acts to image the input lenslet array to the output lenslet array. Light 380 then passes through, if necessary, polarizing beam splitter 362. After passing through polarizing beam splitter 362 by virtue of its y' polarization, it then returns to the original λ/4 plate, which converts the y'=x+y polarized light to a polarization state x+iy, i.e., identical to the original input polarization state. Light 380 then exits the switching element the same way it came in, and proceeds to target 386.

Similar to the embodiment disclosed in FIG. 10, switch element 350 may be utilized in an array of switch elements (not shown). A dichroic beam splitter may be provided between the switch element 350 and sources 351 to reflect light of a predetermined wavelength to the switch element and transmit not in the predetermined wavelength to other switch elements.

Figure 14:
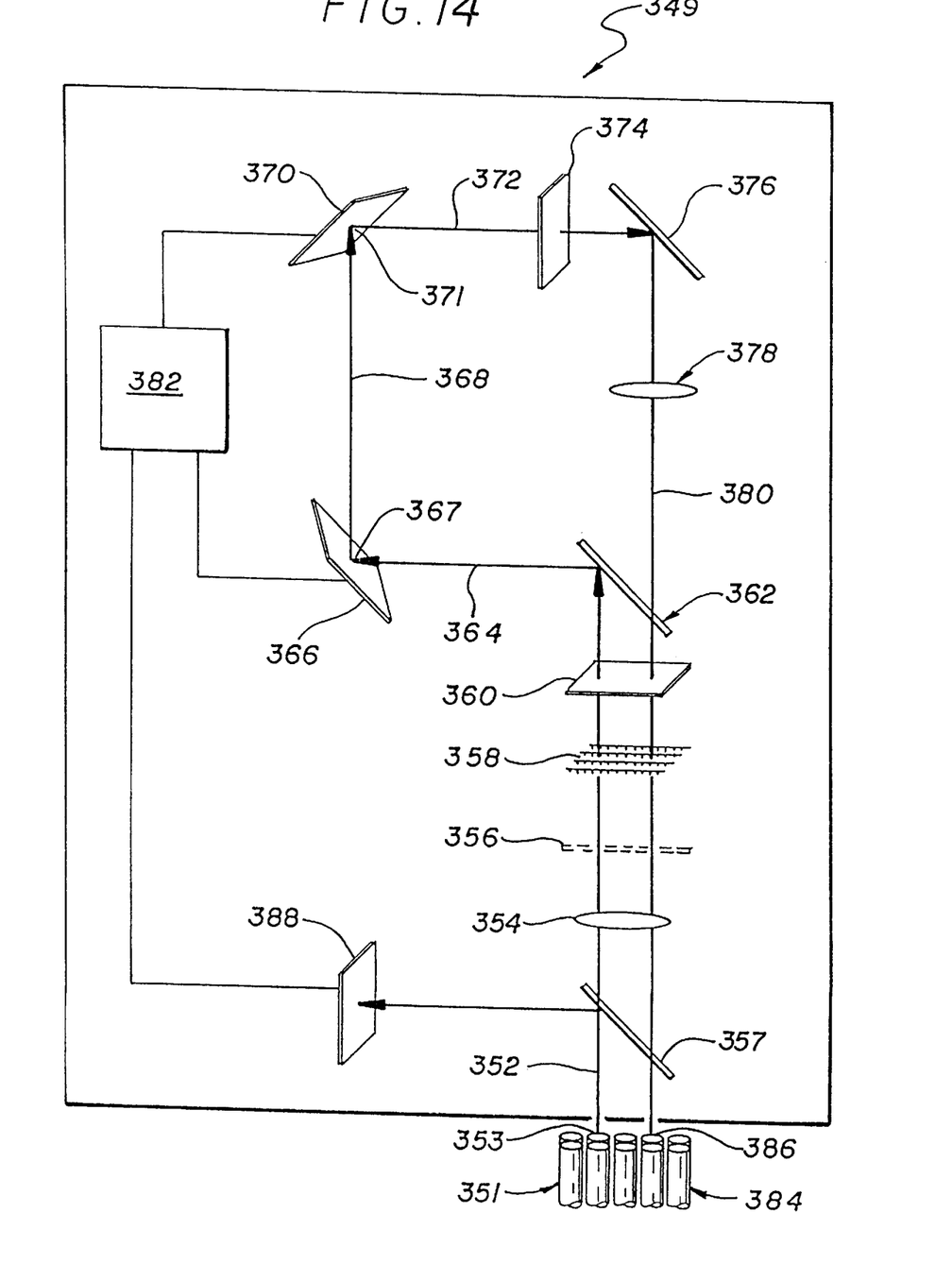
FIG. 14 is an alternate configuration of the embodiment illustrated in FIG. 12.
Figure 15:
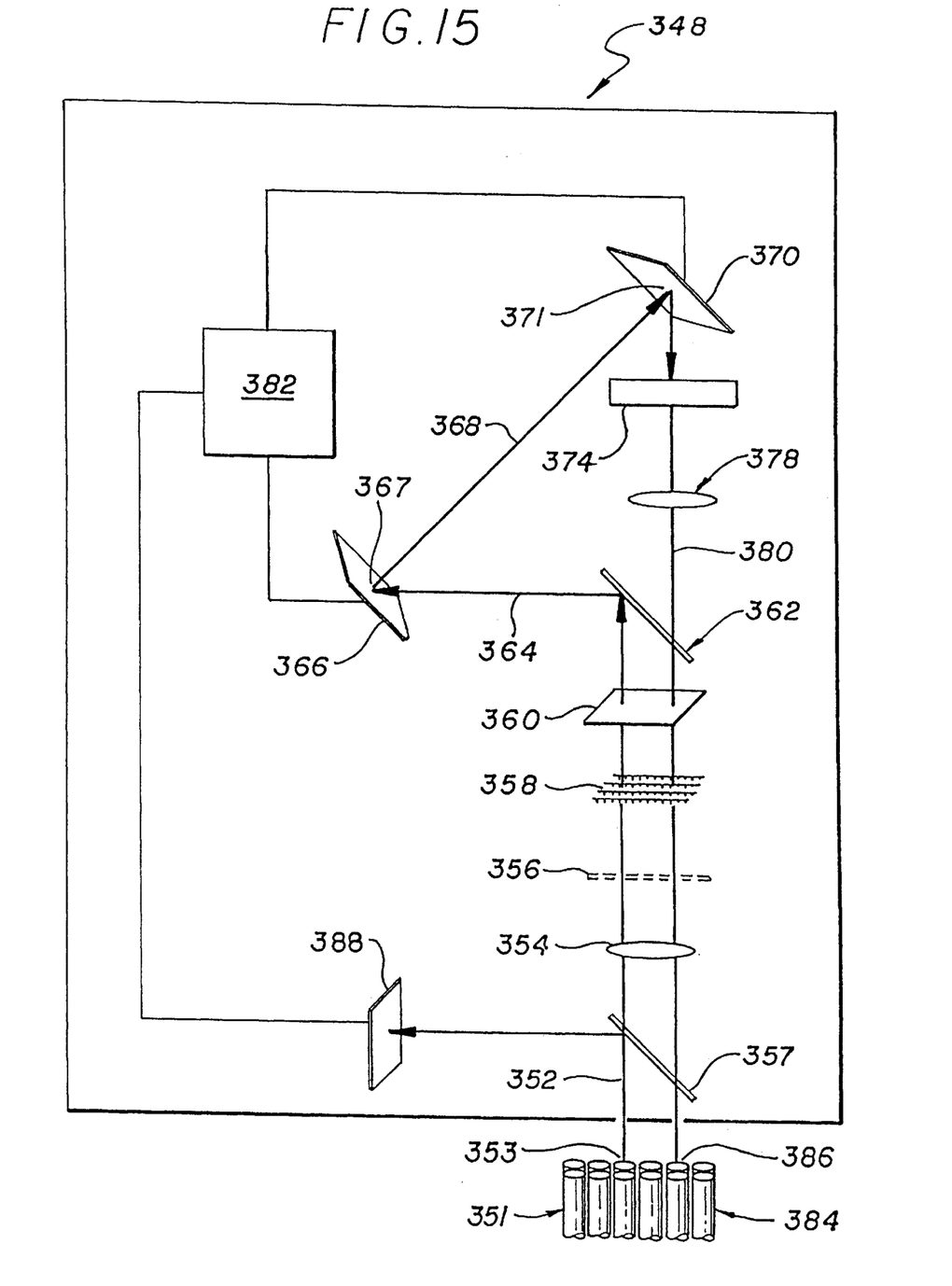
FIG. 15 is an alternate configuration of the embodiment illustrated in FIG. 12.

FIGS. 14 and 15 illustrate embodiments that operate in substantially the same way as the embodiment illustrated in FIG. 13. In the embodiment shown in FIG. 14, MEM array 370 is on the same side of switch element 349 as MEM array 366. In switch element 348 in FIG. 15, MEM array 370 is positioned in line with polarizing beam splitter 362 and targets 384. Thus, mirror 376 (seen in FIGS. 13 an 14) is not required.

Figure 16:
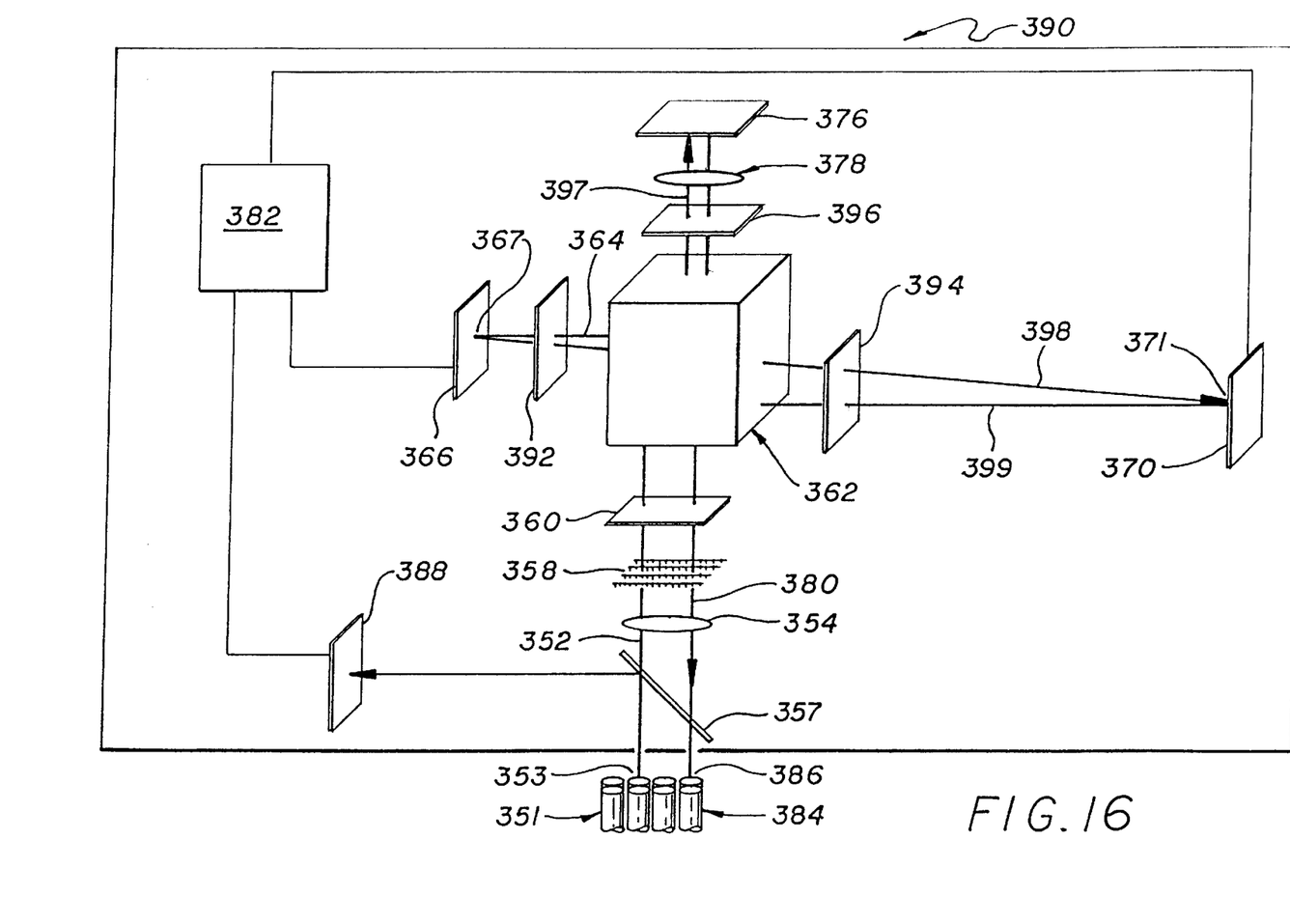
FIG. 16 is an alternate configuration of the embodiment illustrated in FIG. 12 that utilizes four wave plates.

FIG. 16 illustrates an embodiment that utilizes four λ/4 plates 360, 392, 394, and 396. Light 352 is focused, converted, reflected as described above. However, a λ/4 plate 392 between beam splitter 362 and MEM array 366 is used to convert the polarization state from x'=x−y to x−iy. Light 364 impinges on MEM array 366 as before and then propagates back through λ/4 plate 392, which then converts the polarization from x−iy to x+y=y'. Thus, light 398 becomes orthogonally polarized and passes through polarizing beam splitter 362 to MEM array 370.

Individual beams are directing the light in many different directions after being reflected by MEM array 366, and if these directions are larger than about 10 degrees from normal incidence at λ/4 plate 392 and at polarizing beam splitter 362, significant errors in the polarization state of the light may occur. Thus, reflection angles are limited in this embodiment to less than about 10 degrees from normal incidence.

After light 398 passes through polarizing beam splitter 362, the light passes through a third λ/4 plate 394 that converts the polarization state from y'=x+y to x+iy. The light 398 then proceeds to MEM array 370, which performs the same functions as in the previous embodiments. Reflected light 399 passes through the third λ/4 plate 394 where its polarization state is changed from x+iy to x'=x−y.

By virtue of this new polarization state, the light is now reflected by the polarizing beam splitter upwards towards a fourth λ/4 plate 396 that converts the polarization state from x'=x−y to x−iy. Light 397 then passes through lens 378, reflects from mirror 376 back through the lens. Lens 378 focal length is chosen so that the double transmission of the light results in imaging lenslet array 358 onto it self, similar to what was done in the embodiment shown in FIG. 4.

Light is again incident on fourth λ/4 plate 396, which now converts the polarization state from x−iy to y'=x+y. By virtue of this new polarization state, light 380 transmits through polarizing beam splitter 362 and then passes out switching element 390 in the same manner as described in the previous embodiment.

CONCLUSION

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. An optical switch element for use with at least one source, the source being adapted to transmit an optical signal to the optical switch device, and a plurality of targets, the targets being adapted to receive the optical signal from the optical switch device, the optical switch device comprising:

(A) a beam splitter, the beam splitter being adapted to transmit light in a first predetermined polarization and reflect light in a second predetermined polarization;

(B) a first wave plate positioned between the source and the beam splitter, the first wave plate being adapted to transmit light in the polarization that is reflected by the beam splitter, wherein light transmitted by the source passes through the wave plate and is reflected by the beam splitter;

(C) a first micro-electromechanical mirror positioned to receive light reflected by the beam splitter, the first micro-electromechanical mirror being adapted to selectively reflect light in a plurality of paths, the paths corresponding to the positions of the plurality of targets;

(D) a second micro-electromechanical mirror positioned to receive light reflected by the first micro-electromechanical mirror, the second micro-electromechanical mirror being adapted to reflect light in a path, the path being a predetermined orientation relative to at least one of the targets;

(E) a second wave plate positioned between the second micro-electromechanical mirror and the beam splitter, the second wave plate being adapted to transmit light in the polarization that is transmitted by the beam splitter, wherein light reflected by the second micro-electromechanical mirror passes through the second wave plate and is transmitted by the beam splitter.

2. The optical switching element of claim 1 further comprising a lenslet array between the source and the beam splitter, the lenslet array being adapted to put collimated light onto the first micro-electromechanical mirror.

3. The optical switching element in claim 2 further comprising a lens positioned between the second micro-electromechanical mirror and the lenslet array, wherein light reflected by the second micro-electromechanical mirror is imaged on the lenslet array.

* * * * *